(12) United States Patent
Lee (10) Patent No.: US 6,704,725 B1
(45) Date of Patent: Mar. 9, 2004

(54) METHOD OF SEARCHING MULTIMEDIA DATA

(75) Inventor: Jin Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 358 days.

(21) Appl. No.: 09/606,155

(22) Filed: Jun. 29, 2000

(30) Foreign Application Priority Data

Jul. 5, 1999 (KR) .......................................... 1999-26939

(51) Int. Cl.[7] .............................. G06F 17/30; G06K 9/54
(52) U.S. Cl. ............................................. 707/4; 382/305
(58) Field of Search ........................... 707/404.1, 516, 707/1–10; 382/305, 306

(56) References Cited

U.S. PATENT DOCUMENTS

| | | | | |
|---|---|---|---|---|
| 5,742,706 A | * | 4/1998 | Yu ............................. | 382/229 |
| 5,802,361 A | * | 9/1998 | Wang et al. ................. | 382/217 |
| 5,855,015 A | * | 12/1998 | Shoham ......................... | 707/5 |
| 5,893,095 A | * | 4/1999 | Jain et al. ...................... | 707/6 |
| 6,263,334 B1 | * | 7/2001 | Fayyad et al. ................. | 707/5 |
| 6,269,358 B1 | * | 7/2001 | Hirata ............................ | 707/1 |
| 6,424,746 B1 | * | 7/2002 | Nishida ....................... | 382/195 |
| 6,567,551 B2 | * | 5/2003 | Shiiyama .................... | 382/217 |

* cited by examiner

*Primary Examiner*—Safet Metjahic
*Assistant Examiner*—Marcin Filipczyk
(74) *Attorney, Agent, or Firm*—Fleshner & Kim, LLP (57) ABSTRACT

A method of searching multimedia data is disclosed. In the present invention, an image is searched based upon normalized feature information which has been normalized. By normalizing the feature information, the weights of features used in searching an image can be more efficiently determined, thereby allowing a more accurate image search.

27 Claims, 6 Drawing Sheets

METHOD OF SEARCHING MULTIMEDIA DATA

BACKGROUND OF THE INVENTION

1. Field of the Invention

The present invention relates to multimedia data, and more particularly, to a method of searching multimedia data using normalizing information of feature elements included in a specified image.

2. Background of the Related Art

Recently, the digital image signal processing technology has been developing rapidly and has been applied in many fields. Some of these fields includes a search system for automatically editing only a face of a specific character in a moving picture file of a movie or drama; a security system for permitting access only to those registered in the system; and a search system for searching a particular data from an image or video detected by a detecting system. In any application field, the performance of a system essentially depends on the accuracy and speed of detecting or searching a desired object. Accordingly, various image searching methods have been proposed in the related art.

Generally, an image search system searches for similarity of images using features included in images such as a color histogram or color of partial regions. Thereafter, the system provides a user with the search result, i.e. similar images. If the user is satisfied with the search results, the search operation terminates. However, it may be difficult to find a desired image by only one search. Therefore, the user may search for the desired image using weights of features predetermined in the search system for sorting each image.

There are two typical methods for setting the weights of features. In the first method, a user sets and updates the weights of features using a user interface when the user searches the database. In the second method, a search system automatically sets and updates the weights of features using Relevance Feedback from users.

In the first method, a consistent standard is difficult to defined when general users set the weights of features. Also, an error may occur when learning the weights of the features because respective features may have different similarity distributions. For example, suppose a feature A in an image is set to have more weight than a feature B by a ratio of 6:4 when a user is searching for a reference image and that the average of the similarity distribution of feature A is 50 while the average of the similarity distribution of feature B is 70.

If image 1 and image 2 are in the database, and if feature A ranks image 1 higher than image 2 while feature B ranks image 2 higher than image 1, image 1 should be ranked higher overall since feature A is more important. However, since the average similarity of feature A is lower than that of feature B, image 2 may be ranked higher than image 1 when judging only by the similarity, irrespective of the weights. Namely, when a search system determines the similarity of feature A and feature B in image 1 as 60 and 70 respectively, and the similarity of feature A and feature B in image 2 as 50 and 90 respectively, the search system would determine image 2 as having a higher rank than image 1, even if weights are considered.

Therefore, the weights of features may not be reflected and an error may occur, even if users determines and corrects the weights of the features included in images as because similarity distributions of each feature are different.

In the second method in which a search system automatically sets and updates the weights of features using Relevance Feedback from users, an error may occur when setting and updating the weights of each feature since similarity (or difference) distribution of each feature in images differ. Namely, after a user searches for an image, the user gives positive relevance back to the search system for similar images to a reference image, and gives negative relevance for different images to the reference image. Thus, the search system automatically sets and updates the weights of features included in each image according to the relevance feedback by the user.

However, each feature in an image is generally evaluated in a different manner when determining a similarity of an image. For example, suppose that a search system searches for ten similar images and sorts the images by evaluating the similarity based on each feature. At this time, an image may be ranked fifth if similarity of feature A is 80 and the same image may also be ranked fifth if similarity of feature B is only 60. This is due to the different distribution of each feature in an image. Accordingly, an error may occur when the weights of features in the images are set and updated using similarity (or difference) of features having different distribution.

For example, suppose that an average of the similarity distribution for feature A is 50 and the average of the similarity distribution for feature B is 70, when a search system searches for a reference image using feature A and feature B. If feature A and feature B had the same distribution, the same weights would be assigned to feature A and B when the system ranks an image ranked the same by features A and B higher. However, if the system sets the weights of features A and B using an image ranked the same by feature A and B, an error of setting the weight of feature B greater than feature A would occur because the similarity for feature B is relatively greater than the similarity of feature A due to the different similarity distribution.

On the other hand, when a user gives feedback on one image as irrelevant, feature A with respectively low similarity will be assigned more weight, even if the irrelevant image was ranked the same by both features A and B. Therefore, the method for setting weights in the related art by user feedback may have problems in learning wrong weights since each feature included in images have different similarity (or difference) distribution.

SUMMARY OF THE INVENTION

Accordingly, an object of the present invention is to solve at least the problems and disadvantages of the related art.

An object of the present invention is to provide a method of searching multimedia data using normalizing information of features.

Another object of the present invention is to provide a method of normalizing information used in learning weights of features for searching an image.

A further object of the present invention is to provide a data structure used in learning the weights of features for searching an image.

Additional advantages, objects, and features of the invention will be set forth in part in the description which follows and in part will become apparent to those having ordinary skill in the art upon examination of the following or may be learned from practice of the invention. The objects and advantages of the invention may be realized and attained ash particularly pointed out in the appended claims.

To achieve the objects and in accordance with the purposes of the invention, as embodied and broadly described herein, a method of searching multimedia data comprises normalizing information of each feature in at least one multimedia data in a search system; normalizing distribution of similarities or differences of each feature corresponding to the multimedia data using the normalizing information in the search system; and updating weights of each feature using the normalized similarity or difference.

In another embodiment of the present invention, a method of searching multimedia data comprises obtaining a Probability Density Function (PDF) corresponding to similarity or difference of features in a prepared multimedia data set in a multimedia data search system; obtaining Cumulative Distribution Function (CDF) corresponding to each feature using said PDF in said multimedia data search system; obtaining a first slope and a first mean to approximate said CDF in the multimedia data search system; setting a second slope and a second mean of normalizing object respectively in the multimedia data search system; obtaining similarity or difference corresponding to each feature of target multimedia data and reference multimedia data according to the reference multimedia data selected by user in the multimedia data search system; normalizing similarity or difference of features using the first and second slopes, and the first and second means included in the target multimedia data and reference multimedia data in the multimedia data search system; obtaining similarity or difference of the entire multimedia data using weights of features corresponding to the normalized similarity in the multimedia data search system; and searching corresponding multimedia data using similarity and difference of the entire multimedia data and sorting the searched multimedia data to provide said user with the results of said multimedia data search system.

The present invention also provides normalizing information of each feature in the multimedia data comprising description of image characteristics and normalizing descriptor.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
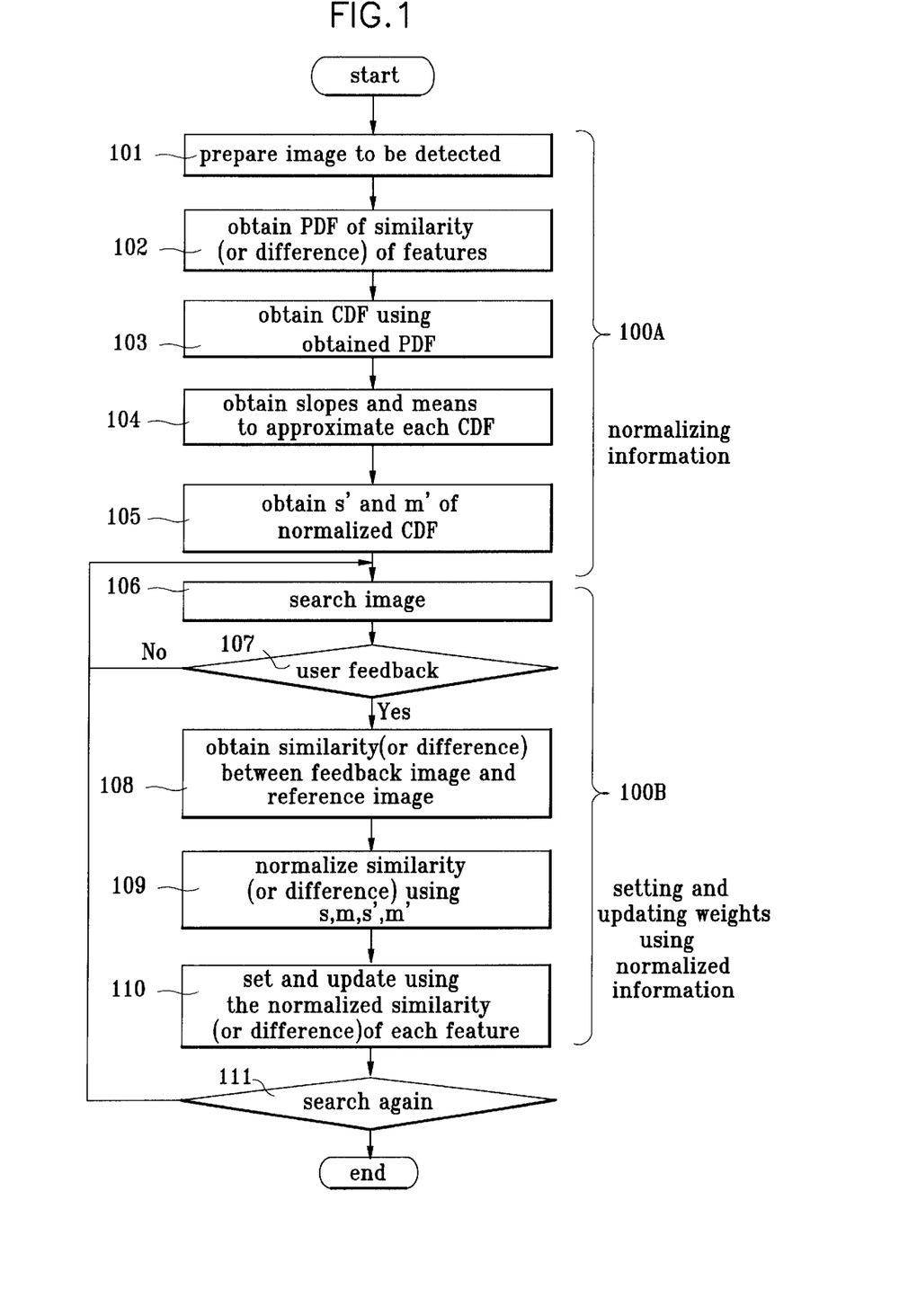
FIG. 1 is a flowchart of an image searching process according to a first embodiment of the present invention.

FIG. 1 shows a flowchart of the present invention which can be divided into a process for normalizing information (100A), and a process for setting and updating the weights using the normalizing information (100B). The setting and updating the weights here means converting the similarity to a normalized value using the normalizing information of each feature obtained when a user gives relevance feedback. Although the feature information may be normalized by any method, the preferred embodiment of the image search system presents the characteristic of feature distribution as CDF to normalize information for setting and updating the weights. By using the CDF, the similarity values obtained according to each feature is normalized such that the weights for each feature can be more accurately learned using the user feedback.

Referring to FIG. 1, a search system prepares an initial set of a plurality of target images to obtain similarity (or difference) distribution of features (step 101). The search system obtains a similarity (or difference) PDF of each feature (step 102) by comparing the similarity (or difference) of each feature in a reference image and the plurality of target images in the initial set. The Search system then obtains a CDF of each feature using the obtained PDF (step 103). Thereafter, the slope s and mean m of each CDF is calculated to approximate the obtained CDF (step 104). Namely, each CDF is approximated by a Sigmoid function which minimizes the approximation error. Finally, the search system sets slope s' and mean m' of a reference CDF, i.e. a normalized CDF, using the obtained slope s and mean m (step 105).

Figure 3:
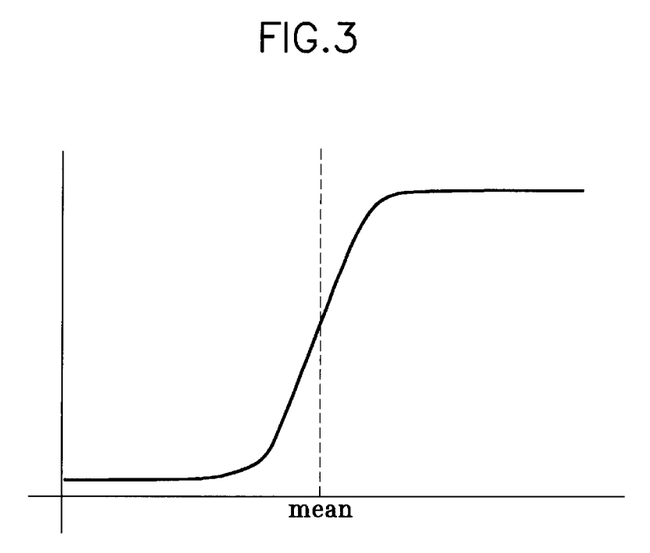
FIG. 3 shows a Sigmoid function curve applied in an image searching process according told the present invention.

Thus, when normalizing information, the similarity (or difference) distribution is presented as CDF and the CDF curve is approximated using a Sigmoid function. The Sigmoid function can be expressed as in Equation 1 and is shown in FIG. 3.

$$\phi(x) = \frac{1}{1 + \exp^{(-s(x-m))}} \quad [1]$$

In the above equation, s denotes the slope and m denotes the mean. Here, as s rises, the slope of the curve in FIG. 3 increases. Also, if exp(constant) is replaced with a value of 2 when a similarity distribution y is represented by a CDF, the similarity distribution y can be expressed by a Sigmoid function as in Equation 2 below.

$$y = \frac{1}{1 - 2^{-s(x-m)}} \quad [2]$$

Figure 4:
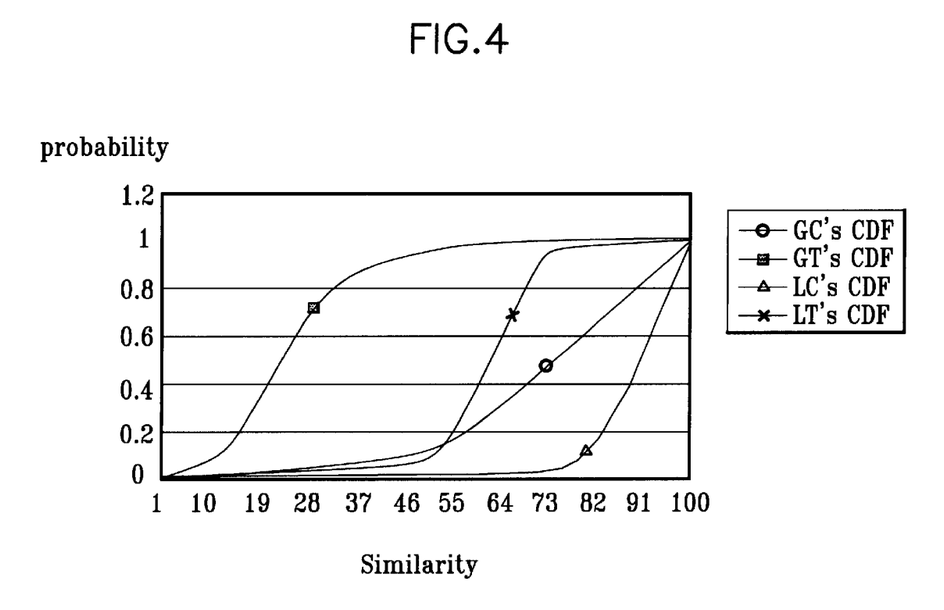
FIG. 4 is shows a curve representing CDF of difference corresponding to the features: included in the specified image according to an embodiment of the present invention.

FIG. 4 shows feature information obtained from an image set by CDF curves. Here, the feature information includes a Global Color (GC), Global Texture (GT), Local Color (LC), and Local Texture(LT). As shown in FIG. 3 and FIG. 4, the CDF curves of the four features are generally in the shape of the Sigmoid function, except that the mean m and the slope s of each feature differ. Accordingly, the CDF curve may be represented by a Sigmoid function through Equations 1 and 2 if the slope and mean are provided. Thus, obtaining the CDF function of a feature means obtaining the slope s and the mean m with the least error when the CDF curve is approximated by the Sigmoid function.

In the preferred embodiment, the search system finds the optimal values of slope s and mean m by calculating the error between the actual CDF and an approximated CDF using different values of the slope s and mean m.

Particularly, the slope s and the mean m is increased from the lowest to the largest value by a predetermined increment and the slope s and mean m which results in the least error is determined as the optimal slope s and mean m.

Accordingly, the system can obtain the respective values of slope s and mean m representing a CDF of each feature in step 104 of FIG. 1 and can then normalize the similarity (or difference) obtained from the corresponding features in step 105 by obtaining the slope s' and mean m' of a reference CDF. Here, the slope s' and the mean m' may be obtained based upon a mean value of the slopes and a mean value of the means of each feature; the slope and mean values of a CDF for a normal distribution; or a slope and a mean value set by a user such as between 10~15 for the slope and greater than 0.5 but within mean of each feature for the mean.

After obtaining the normalizing information as above, a reference image is used in the image search (step 106) using features with existing weights if assigned or without use of weights and the user may give relevance feedback for each image on an image list resulting from the search (step 107). If there is user feedback, the search system obtains the similarity (or difference) between each feedbacked image and the image to be detected (step 108). Namely, the search system obtains the similarity (or difference) between the feedback images and the reference image (or query image) based upon each feature information. The obtained similarity (or difference) is converted and normalized using the slope s and mean m obtained for each feature and the slope s' and mean m' of the CDF (step 109).

Figure 5A:
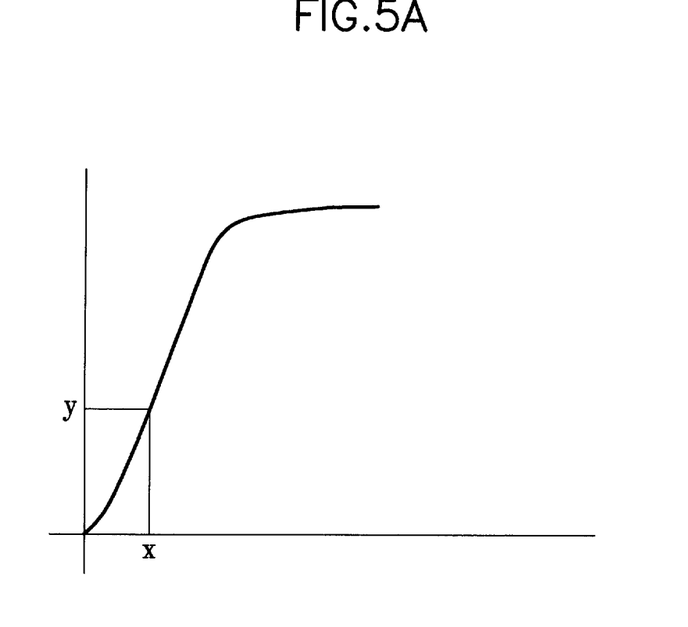
FIGS. 5A and 5B show a curve representing CDF for explaining the concept of normalization according to an embodiment of the present invention.
Figure 5B:
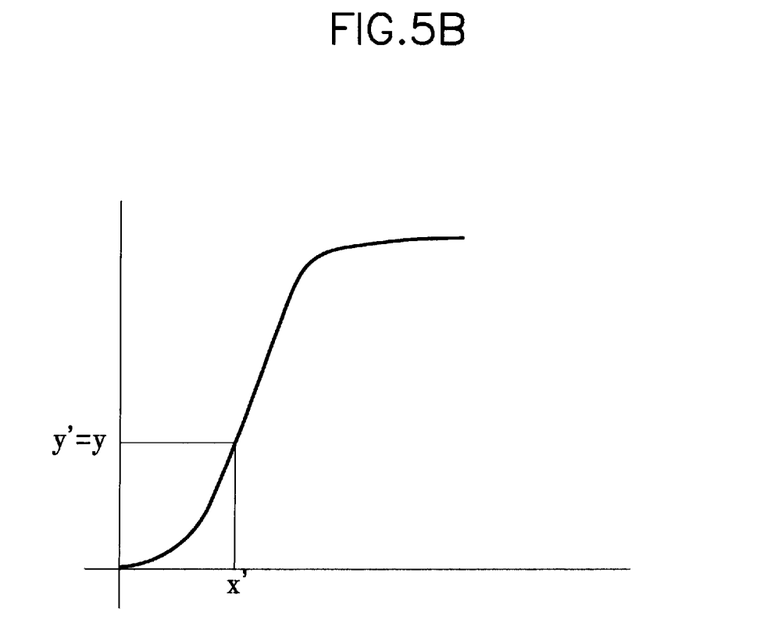

The normalizing of the similarity (or difference) will be explained with reference to FIGS. 5A and 5B. Assume that FIG. A is a CDF curve of a feature and FIG. 5B is a reference CDF curve. If a similarity (or difference) of a feedback image in rank y in FIG. 5A is x, the normalized similarity (or difference) would be x' corresponding to rank y' in FIG. 5B. Namely, when a similarity (or difference) value x corresponding to y in FIG. A is substituted by the reference CDF curve of FIG. 5B, the normalized x would become x'. Using this concept, the similarity can be normalized by Equation 3 below.

$$x' = -\frac{1}{s'}\log(2^{-s(x-m)}) + m' \quad [3]$$

In the above equation, x denotes the original similarity (or difference) corresponding to the original rank, x' denotes a normalized similarity (or similarity) corresponding to a normalized rank, s denotes the CDF slope of a feature, m denotes the CDF mean of the corresponding feature, s' denotes the reference CDF slope, and m' denotes the reference CDF mean.

Referring back to FIG. 1, the present search system normalizes the similarity (or difference) as described above (step 109), thereby setting or updating, if weights are already assigned, the weights of each feature in corresponding images using the normalized similarity (or difference) (step 110). Therefore, the weights of features in images are more accurately and efficiently learned, thereby allowing the user to search for a reference image with either newly assigned or updated weights (steps 111 and 106). Here, if there is no user feedback in step 107, the user may continue to search using the features with existing weights if assigned or without weights.

Also, several methods may be used to set and update the weights. For example, if an image is fed back by a user as relevant, the weights of features may be increased in proportion to a similarity determined by each corresponding feature. In contrast, if an image is fed back by a user to be irrelevant, the weights of features would be decreased in proportion to a similarity or difference determined by each corresponding feature. Alternatively, the weights may be set directly by a user, or set in other manner.

Figure 2:
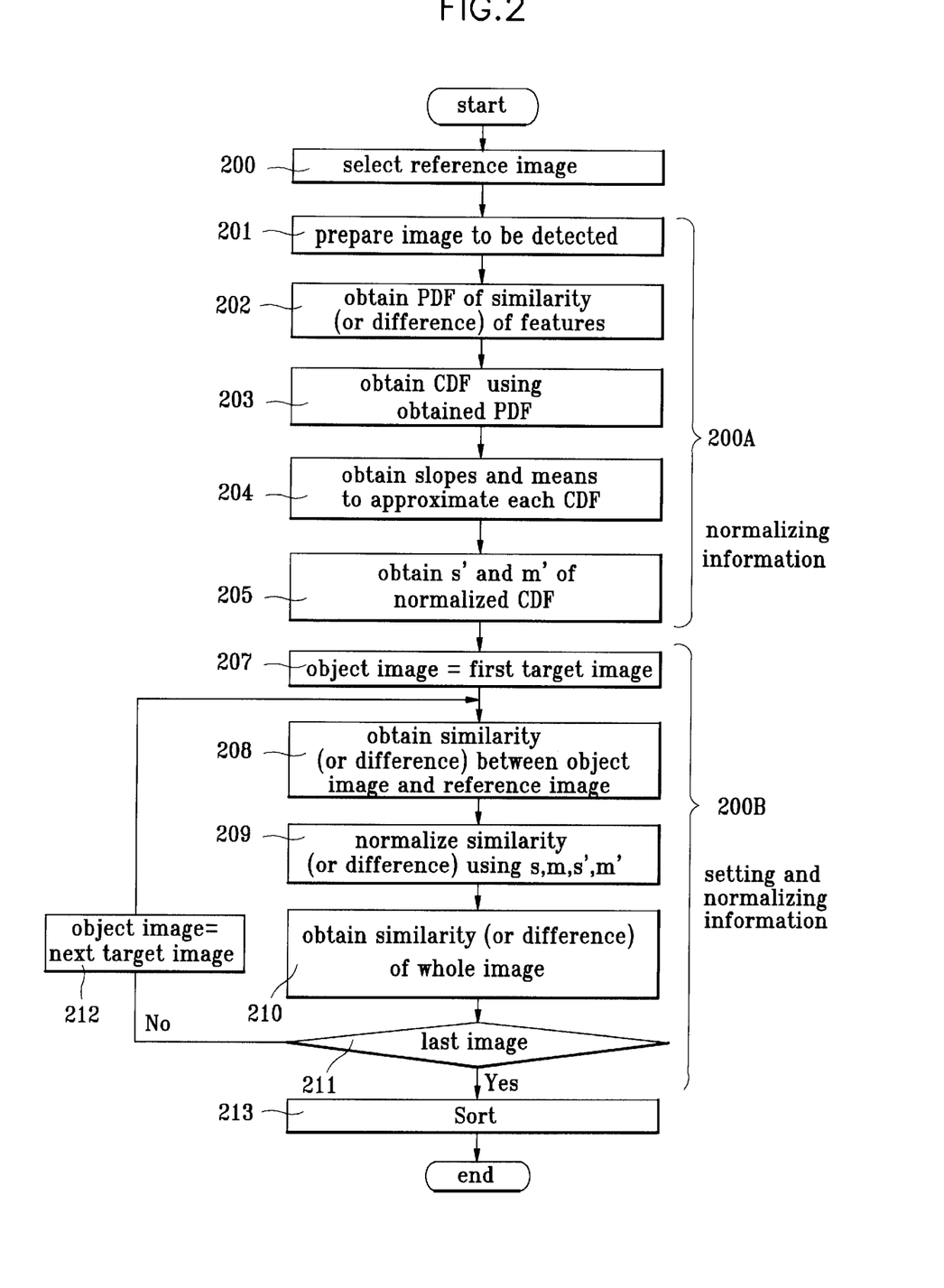
FIG. 2 is a flowchart of an image searching process according to a second embodiment of the present invention.

FIG. 2 is a flowchart of an image searching process according to a second embodiment of the present invention, including a process for normalizing information (200A), and a process for setting the weights using the normalizing information (200B). The second embodiment begins by a user selecting a reference image to search (step 200). Thereafter, the process for normalizing information (steps 201 to 205), is the same as the process of normalizing information described with reference to steps 101 to 105 of FIG. 1 and will be omitted.

When the feature information and normalizing information are extracted, the search system sets a first of n target images as an object image (step 207) and determines the similarity (or difference) between the object image and the reference image by calculating the similarity (or difference) of each feature in the object image and the reference image (step 208). The search system then normalizes the similarity (or differences) obtained by each feature using the slope s, s' and the mean m, m' of features (step 209). At this time, the normalization of the similarity is performed in the same manner as described with reference to step 109 of FIG. 1, FIG. 3, and FIG. 5.

However, in this embodiment, the search system multiplies the weights of features with corresponding normalized similarities (or differences) and obtains the similarity of a whole image by adding the multiplied values (step 210). Thereafter, the search system determines if the current object image is the last target image, i.e. the nth target image (step 211). If the current image is the nth target image, the search system presents the results after sorting the detected images based upon the similarity calculated in consideration of weights (step 213). Otherwise, the object image is set to a next target image (step 212) and steps 208~210 are repeated until the current object image is the nth target image.

According to the image search method in FIG. 2, a reference image can effectively be searched by normalizing the similarity (or difference) obtained using the original features. Here, the weights can also be set by learning through relevance feedback from a user as described with reference to FIG. 1. Similarly, the weights may alternatively be set directly by a user, or may be set in any other manner.

In addition to accurate weights, an image search system requires a standardization of features used in image searches. In this case, image descriptions in images can most effectively be used if information describing features which extract the image descriptions is presented well. Accordingly, the present invention implements a data structure for the search system and the user interface during an image search including feature information and normalizing information. If a standardized data structure used during an image search includes feature information and normalizing information, the weights of features would be more accurately set using the reference CDF of features even if the image is transferred to a different server, thereby allowing a more accurate image search.

Figure 6A:
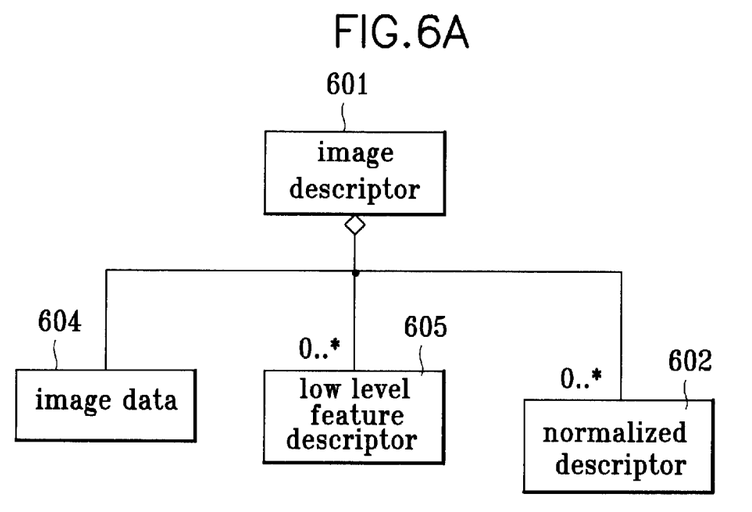
FIGS. 6A and 6B show a data structure applied in an image searching process according to the present invention.
Figure 6B:
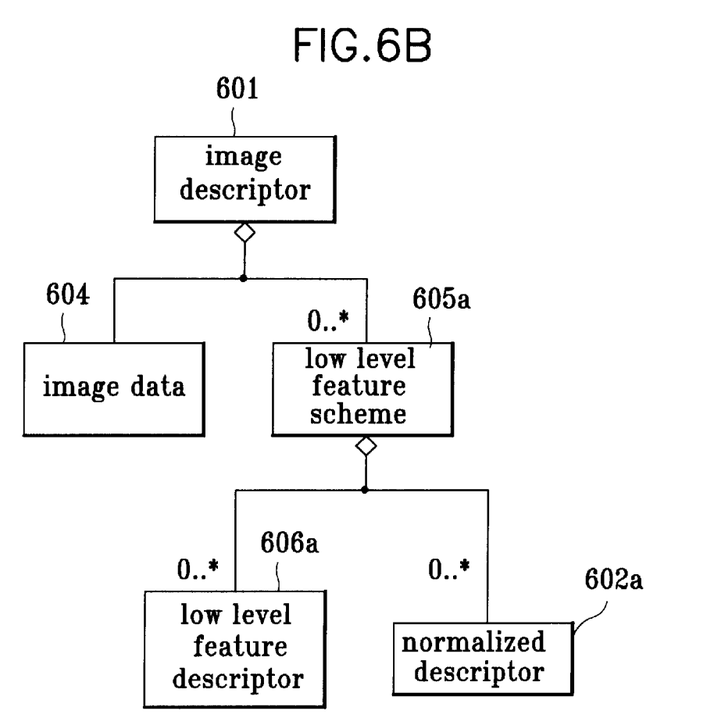

Particularly, FIGS. 6A and 6B show a data structure including normalizing information as described above with reference to FIGS. 1 and 2 for representing an image. The data structure of FIG. 6A includes an image descriptor 6011 which divides into sub-levels of normalized descriptor 602, image data 604, and low level feature descriptor 605. Similarly, the data structure of FIG. 6B includes an image descriptor 601 which divides into sub-levels of image data 604 and low level feature scheme 605a. Here, the low level feature scheme 605a is further divided into low level feature descriptor 606a and normalized descriptor 602a.

Figure 7:
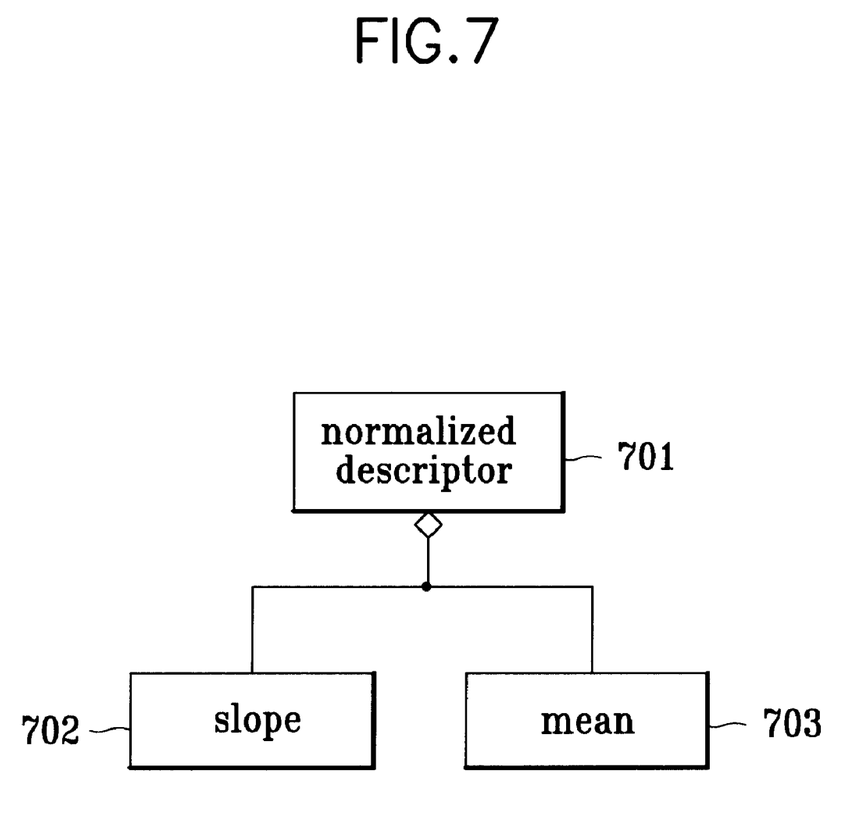
FIG. 7 shows a data structure of normalizing descriptor according to the present invention.

Furthermore, as shown in FIG. 7, the normalized descriptor 701 may include slope information 702 and mean information 703. That is, the search system provides a basis of searching an image effectively by normalizing features in image descriptors even if the image is transferred to a different server.

Accordingly, in the present invention, the weights of features in images can more learned more accurately and efficiently by normalizing the similarity (or difference) using the normalizing information of the features. Therefore, the present invention prevents or reduces learning errors caused by each feature having different similarity distribution. Finally, the normalizing information allows a more effective search even if an image is transferred to a different server.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of searching multimedia data comprising:
   (a1) obtaining normalization information of each of a plurality of features in a reference image using at least one multimedia data in a search system, wherein the normalization information has differing values for each of at least two features that have different similarity distributions with respect the reference image;
   (b1) searching for multimedia data similar to the reference image using at least one of the features and outputting similar multimedia data, wherein weights of features are used; and
   (c1) normalizing similarity values of the plurality of features of said similar multimedia data using the normalization information, wherein said similarity values are determined based on features used in (b1).

2. A method of claim 1, further comprising assigning weights of features if weights do not exist or updating existing weights of features, wherein said weights are assigned or updated using the normalized information.

3. A method of claim 2, further comprising receiving user feedback after searching for the reference image in (b1), and assigning or updating the weights of features using both the normalization information and the user feedback.

4. A method of claim 1, further comprising sorting the normalized multimedia data based upon relevance and displaying sorted multimedia data.

5. A method of claim 1, wherein (a1) comprises:
   (a2) obtaining a probability density function (PDF) of each feature based upon a similarity between the reference image and said at least one multimedia data;
   (b2) obtaining a cumulative distribution function (CDF) of each PDF; and
   (c2) obtaining normalizing information for the reference image based upon each CDF.

6. A method of claim 5, wherein (c2) comprises:
   obtaining a slope s and a mean m to approximate each CDF using a Sigmoid function; and
   setting a slope s' and a mean m' of a reference CDF representing the reference image.

7. A method of claim 6, wherein obtaining the slope s and the mean m by calculating an error between the actual CDF and an approximated CDF using different values of slope s and mean m.

8. A method of claim 6, wherein setting the slope s' and the mean m' based upon a mean value of the slopes and a mean value of the means of each feature, a slope and mean values of a CDF for a normal distribution, or a slope and a mean value set by a user.

9. A method of claim 6, wherein in (c1), normalizing a similarity value based upon a feature using a corresponding slope s, a corresponding mean m, the slope s' and the mean m'.

10. A method of claim 1, wherein the normalization information is different for the features in the reference image.

11. A method of normalizing similarity values between a reference image and target images based on features, comprising:
    (a1) obtaining normalization information of features in a reference image using at least one target image in a search system; and
    (b1) obtaining similar values based on similar target images;
    (c1) normalizing the similarity values resulting from a search using the normalization information, wherein the normalization information has differing values for each of at least two features that have different similarity representations with respect to the reference image.

12. A method of claim 11, wherein (a1) comprises:
    (a2) obtaining a probability density function (PDF) of each feature based upon a similarity between the reference image and said at least one target image;
    (b2) obtaining a cumulative distribution function (CDF) of each PDF; and
    (c2) obtaining normalizing information based upon each CDF.

13. A method of claim 12, wherein (c2) comprises:
    obtaining a slope s and a mean m to approximate each CDF using a Sigmoid function; and
    setting a slope s' and a mean m' of a reference CDF of the reference image.

14. A method of claim 13, wherein obtaining the slope s' and the mean m by calculating an error between the actual CDF and an approximated CDF using different values of slope s and mean m.

15. A method of claim 13, wherein setting the slope s' and the mean m' based upon a mean value of the slopes and a mean value of the means of each feature, a slope and mean values of a CDF for a normal distribution, or a slope and a mean value set by a user.

16. A method of claim 13, wherein in (c1), normalizing a similarity value based upon a feature using a corresponding slope s, a corresponding mean m, the slope s' and the mean m'.

17. A method of claim 11, wherein the normalization information is different for the features in the reference image, and wherein each feature is evaluated differently when determining the similarity values, and wherein the target image comprises multimedia data.

18. A data structure stored in a computer readable medium for an image in an image search system comprising:
    features descriptor of a reference image; and normalization information corresponding to each feature in the feature descriptor, wherein the normalization information has differing values for each of at least two features that have different similarity distributions with respect to the reference image.

19. A data structure stored in a computer readable medium of claim 18, wherein the normalization information comprises a slope information and a mean information.

20. A data structure stored in a computer readable medium of claim 18, wherein the normalization information is obtained by a method comprising:

(a) obtain a probability density function (PDF) of each feature in the feature descriptor based upon a similarity between a reference image and at least one target image;

(b) obtaining a cumulative distribution function (CDF) of each PDF; and (c) obtaining normalizing information based upon each CDF.

21. A data structure stored in a computer readable medium of claim 20, wherein (c) comprises:

obtaining a slope s and a mean m to approximate each CDF using a Sigmoid function; and setting a slope s' and a mean m' of a reference CDF.

22. A data structure stored in a computer readable medium of claim 18, wherein the normalization information is different for the features in the reference image.

23. A method of searching multimedia data comprising:

selecting a reference image to search;

preparing an initial set of a plurality of target images to obtain a similarity distribution of each of a plurality of features;

determining a similarity probability density function (PDF) of each of said plurality of features in the reference image by comparing the similarity of said each of the plurality of features in the reference image and the plurality of target images;

determining a cumulative distribution function (CDF) of said each of the plurality of features using a corresponding similarity PDF;

determining a normalized CDF for said each of the plurality of features, wherein at least two selected features of the plurality of features have different normalized CDFs based on said similarity distributions;

conducting a search of multimedia data using selected features of the reference image, wherein the selected features have corresponding weights;

receiving relevance feedback for images in an image list returned by the search;

determining a similarity between each feedback image and the reference image using the at least two selected features;

normalizing the similarity for said at least two selected features using the corresponding normalized CDFs; and updating the weights of the selected features using the normalized similarities.

24. A method of searching multimedia data comprising:

extracting feature information and normalizing information for a plurality of features in a reference image;

determining a set of target images;

setting a first image of the target images as an object image;

determining a similarity of each of a plurality of features in the object image and the reference image; and normalizing the similarity of said each of the plurality of features using corresponding normalization information, wherein at least two of the features have different similarity distributions with respect to the reference image, and wherein the normalization information is different for said each of the at least two features.

25. The method of claim 24, comprising updating weights of said each of the plurality of features using the normalized similarity of said each of the plurality of features.

26. The method of claim 25, comprising:

setting a next image of the set of target images as the object image and repeating the normalizing the similarity of said each of the plurality of features until a last image of the set of target images is selected.

27. The method of claim 26, comprising:

determining a whole image similarity by multiplying feature weights by the normalized similarity for said each of the plurality of features;

adding the multiplied values; and ranking the set of target images by each corresponding whole image similarity.

* * * * *